No. 771,802. PATENTED OCT. 11, 1904.
V. S. BEAM & C. L. CLARKE.
POWER TRANSMISSION.
APPLICATION FILED APR. 16, 1904.
NO MODEL. 3 SHEETS—SHEET 1.

Witnesses. Inventors.
Thomas J. Byrnes. Victor S. Beam and
S. S. Dunham. Charles L. Clarke,
by Kerr, Page & Cooper, Attys.

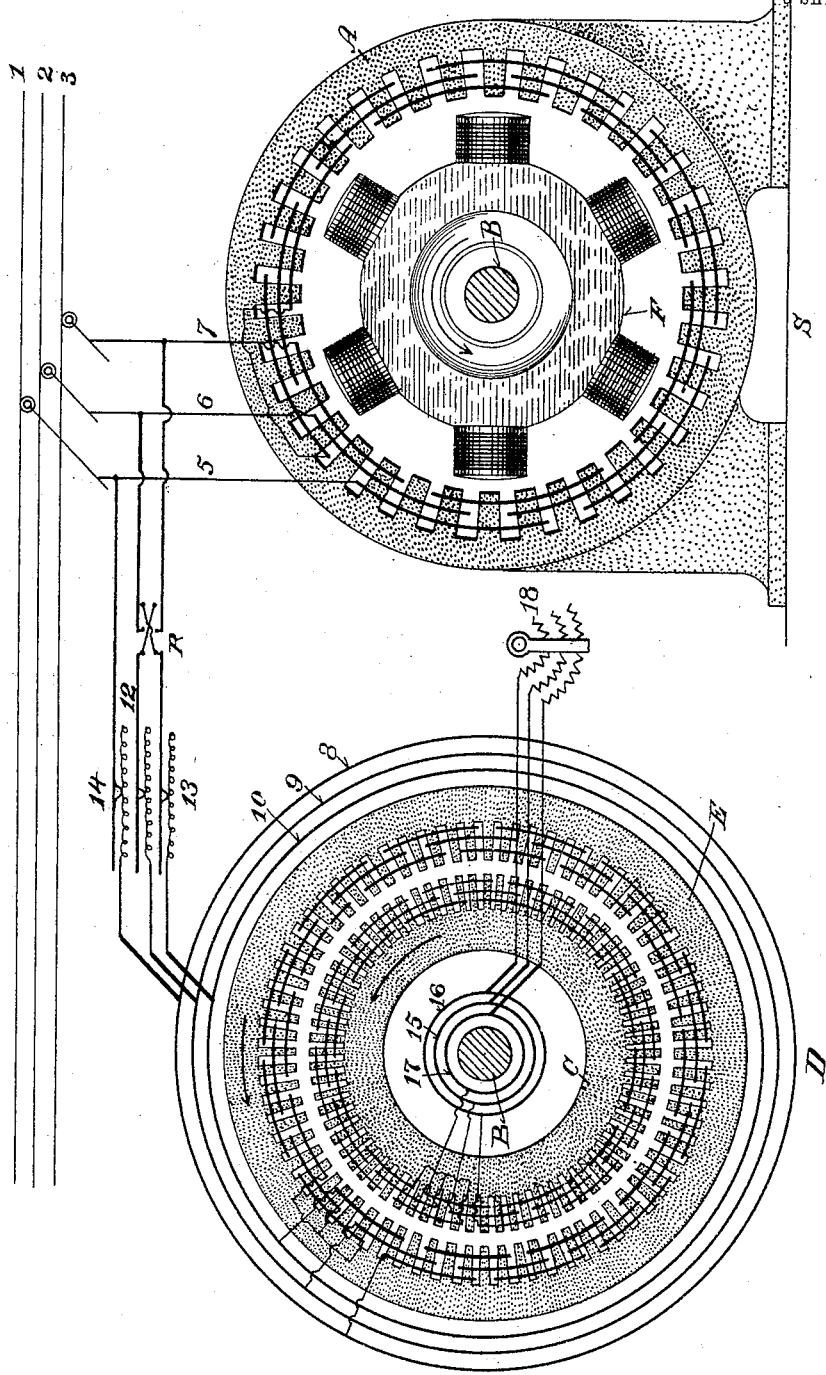

No. 771,802.

Patented October 11, 1904.

UNITED STATES PATENT OFFICE.

VICTOR S. BEAM, OF EAST ORANGE, NEW JERSEY, AND CHARLES L. CLARKE, OF NEW YORK, N. Y.

POWER TRANSMISSION.

SPECIFICATION forming part of Letters Patent No. 771,802, dated October 11, 1904.

Application filed April 16, 1904. Serial No. 203,456. (No model.)

*To all whom it may concern:*

Be it known that we, VICTOR S. BEAM, residing at East Orange, county of Essex, State of New Jersey, and CHARLES L. CLARKE, residing at New York, in the county of New York, State of New York, citizens of the United States, have invented certain new and useful Improvements in Power Transmission, of which the following is a specification.

Our invention relates to improvements in power-transmission systems, its primary object being to secure a variable-speed propulsion from a constant-speed driving-motor, and more particularly to obtain in alternating-current power transmission a variable and regulable speed propulsion from a synchronous and therefore a constant-speed electric motor.

In order to meet the practical requirements of such a method or apparatus as our invention contemplates, we provide a variable-slip electromagnetic clutch between the constant-speed driving-shaft of the motor and the shaft which is to be driven at variable speeds which is efficient and economical in its operation, which dissipates but a small fractional part of the electrical energy developed in it as a necessary consequence of its operation, and which feeds back into the alternating-current-supply circuit of the driving-motor the greater part of such energy. We have furthermore devised incidentally to the carrying out of the main improvements a novel means for obtaining a polyphase rotating field from a single-phase source of supply.

Other objects and advantages of our improvement will be more fully set forth in the description which follows and by reference to the accompanying drawings, in which—

Figure 3:
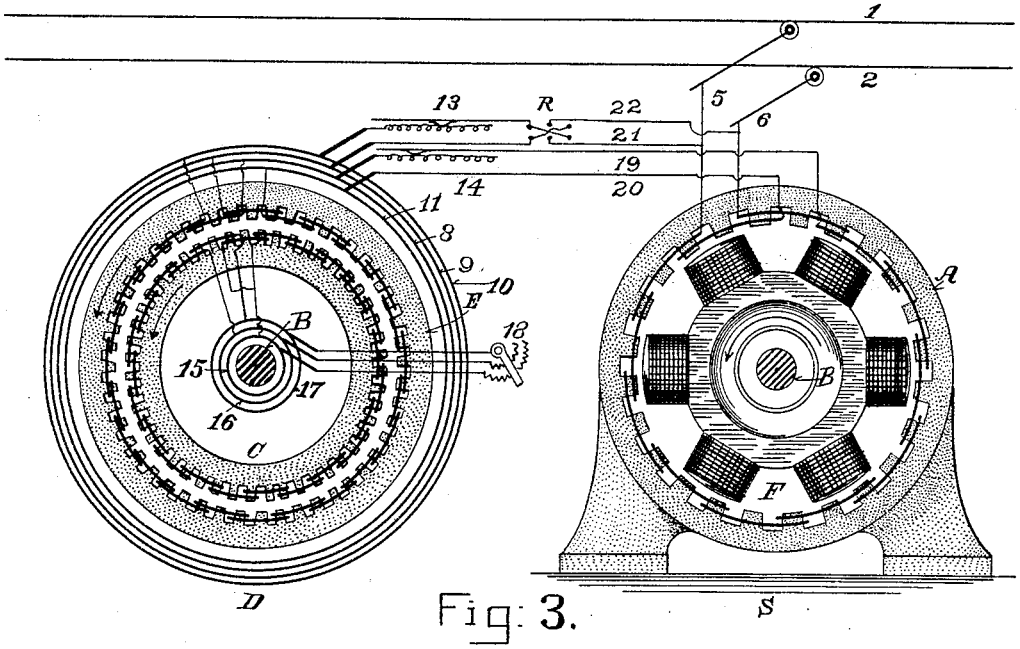
Figure 1:
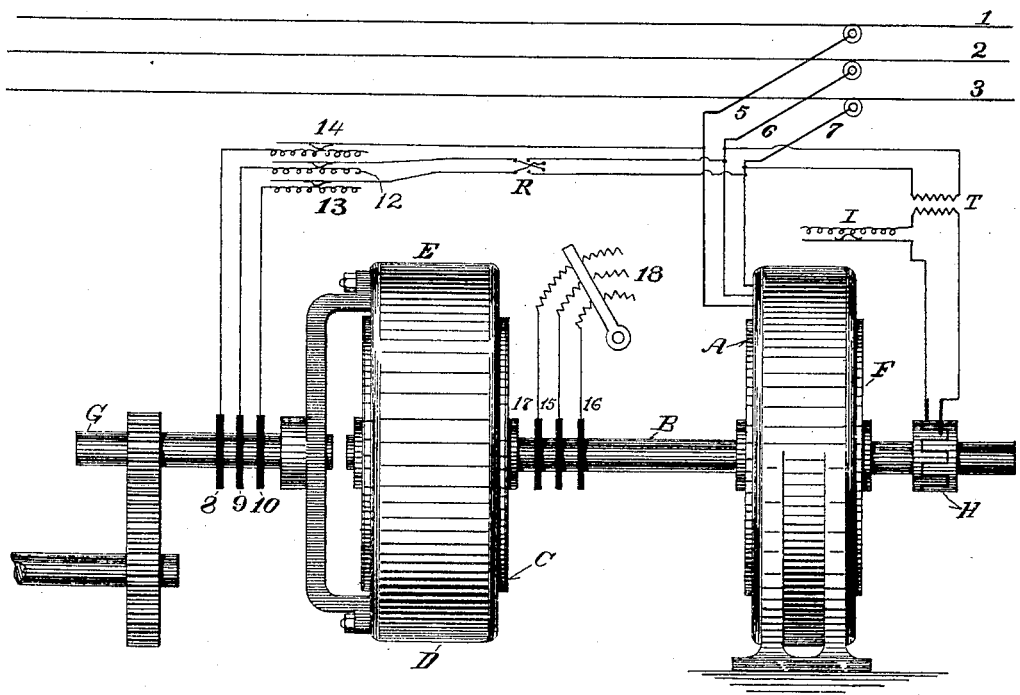
Figure 4:
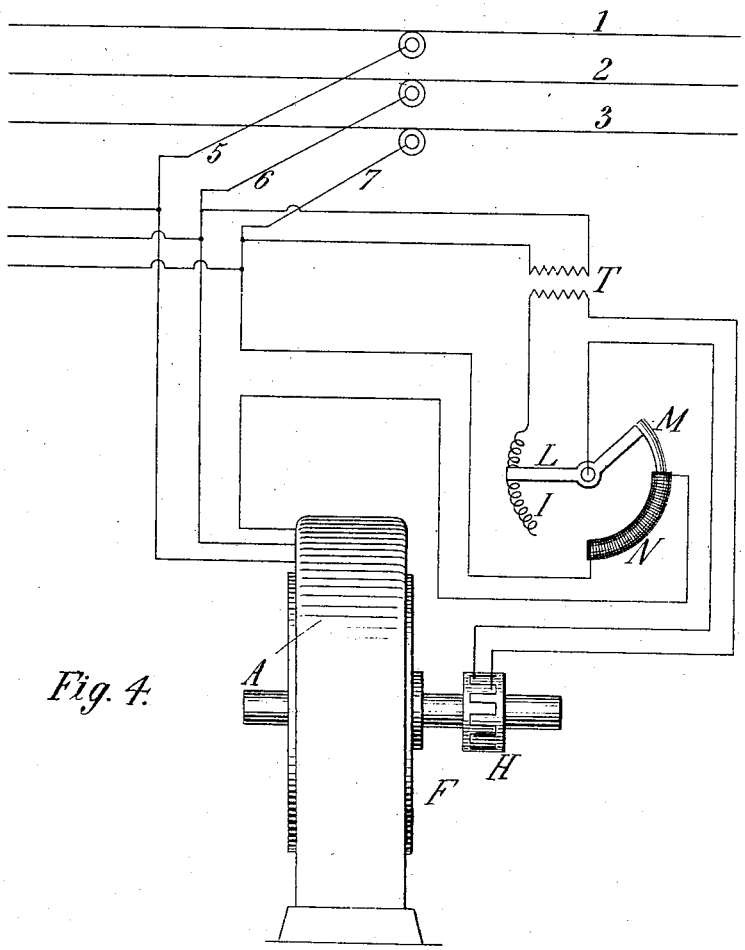

Figure 1 is a partly-diagrammatic view of the improvement with the essential elements or devices shown in side elevation. Fig. 2 is a vertical cross-sectional view of the driving-motor and clutch with details of their electrical characteristics and connections with the supply-circuits. Fig. 3 is a view similar to the preceding, but illustrating the invention as applied to single-phase supply-circuits. Fig. 4 is a view showing typical devices for automatically regulating the excitation of the field.

Referring to Fig. 1, S represents a constant-speed synchronous polyphase motor, shown in this instance as comprising a stationary element or armature A and a revolving field F, mounted on the driving-shaft B. Our variable-slip clutch is essentially a polyphase induction-motor D, the primary element E of which surrounds the secondary C and is mounted so as to be capable of rotation in either direction about a central axis. For this purpose the element E is mounted on or carried by a counter-shaft G in axial alinement with the shaft B and geared or directly connected to the mechanism to be driven—as, for example, the axle of a vehicle, a line of shafting, or other device which is to be driven at variable speeds. As shown in Fig. 2, the synchronous motor S has six poles on its revolving field. These may be energized by direct current supplied from any of the alternating-current-supply circuits 1 2 3 through the medium of a transformer T and of a rectifier H, located on the shaft B, as shown in Fig. 1, or by a direct-current generator mounted on the shaft B or from any other suitable source. The amount of the exciting-current for the field-poles of the synchronous motor may be regulated in the case of Fig. 1 by a variable reactance I; but any other convenient means for regulating the strength of this current may be used. The stationary element A of the synchronous motor is of the ordinary three-phase type, having three sets of coils placed thereon and connected directly to the three-phase supply-circuit 1 2 3 by conductors 5 6 7. The primary element E of the induction-motor is of the ordinary three-phase type, having three sets of coils wound on its inner circumference and connected by means of slip-rings 8 9 10 to the supply-circuits 1 2 3 either directly or by conductors 5 6 7. Variable reactances 12 13 14 may be inserted in the connections to the coils on the element E. The secondary C of the induction-motor D may have an ordinary squirrel-cage winding or an open-circuit winding, as shown in the figures, and connections are made from this winding by means of slip-rings 15 16 17 to an adjustable resistance 18. The induction-motor D is wound so as to have twelve poles or twice the number which are on the field of the synchronous motor S.

In Fig. 3 are shown a two-phase synchronous motor and a two-phase induction-motor, both of which are supplied from a single-phase circuit 1 2. One set of the two-phase coils on the stationary element A of the sychronous motor S is connected directly to the single-phase supply-circuit 1 2 by lines 5 6, while the other set of coils is connected to a corresponding set of coils on the element E of the induction-motor D by means of the conductors 19 20 and slip-rings 8 11. The other set of coils on the element E of the induction-motor is connected to the lines 5 6 through slip-rings 9 10 and conductors 21 22 to the conductors 5 6 and thence to the supply-circuit 1 2. Reactances 13 14 may be inserted in each of the two circuits connected to the field E of the induction-motor D. The secondary C of the induction-motor D of Fig. 3 differs from the one shown in Fig. 2 only in that it is wound for two phase instead of three phase. It is connected by means of slip-rings 15 16 17 to a variable resistance 18. The winding on this secondary may be of any desirable form, it being no part of the invention. A reversing-switch R is shown as inserted in one of the phases connected to the element E of the induction-motor D, so that the direction of its rotating magnetic field may be reversed.

In all of the figures connections are made to the supply-circuits by trolley, indicating that this system may be utilized for traction-work; but we do not wish to be limited to such an application.

An induction-motor thus constructed and arranged as a clutch may be used in connection with any constant-speed driving-motor as a means for transmitting its force to a mechanism which is required to run at variable speeds, although it would be more particularly adapted for use on a locomotive in connection with a synchronous motor. The element E of the induction-motor D may be wound for any number of poles, provided it be greater than the number of those on the synchronous motor, but preferably not greater than twice that number.

The operation of this invention is as follows: It is well known in the art that if an induction-motor be driven above the speed at which it would tend to run if free to act as an induction-motor, the energizing-coils being connected to a source of alternating current, it will generate current. Such action is brought about primarily by the magnetizing influence of the alternating current in its energizing-winding. This magnetizing-current magnetizes the secondary by induction and the latter being driven within the field generates current in the energizing-coils. Such generated current is approximately related to the magnetizing-current so far as phase is concerned in the same way as the work-current in an induction-motor is related to its magnetizing-current. The frequency of this generated current is the same as that of the circuit by which it is driven. The torque and speed curve of such a device when driven above synchronous speed is practically a duplicate of the same machine when run as a motor below synchronism, except that its capacity is somewhat larger when driven as a generator than it is when running as a motor. The amount of current generated by such a machine when driven above synchronism may be regulated either by reactance placed in the energizing-circuits connected to its primary or resistance inserted in the secondary of the same or by a combination of these two means. When such a device is used as a clutch, it is necessary to design it so that when the mechanism to be driven is at rest the relative speed of the two parts of the device shall be considerably above synchronous speed, so that as the mechanism to be driven starts and gains in speed the relative speed of the two parts of the clutch will gradually decrease until it reaches its limit, which we term "synchronous" speed and which corresponds to the speed at which the induction-motor would tend to run as a motor. The synchronous motor S, which is kept in constant operation, drives the shaft B at a certain constant speed, depending on the rate of alternations of the supply-circuit and the number of poles in the field of the motor. The secondary C of the induction-motor or generator D being rigidly mounted on the shaft B is thus driven at the same predetermined speed. Since the number of poles on the field of the induction-motor or generator D is double that of the poles on the synchronous motor S, the relative speed of the two elements of the former, provided the field E is held stationary and polyphase currents be passed through its coils, so that a rotating magnetic field is set up in the same direction as the rotation of the secondary C, will be twice the normal synchronous speed. With this relative motion between the two elements of the machine D it will obviously act as a generator and set up currents in both its primary and secondary windings. The current set up in the secondary winding may be led by means of slip-rings to external resistances, as indicated in the drawings, or they may be restricted to the secondary windings in case these are of the squirrel-cage type or otherwise short-circuited. The currents generated in the primary windings of this machine will be delivered in case of Figs. 1 and 2 to the supply-circuit, from whence it will be taken by the synchronous motor to assist it in driving the secondary of the induction-motor or generator. The induction-motor should be so connected with the supply-circuit that its rotating field shall travel in the same direction as the induction-motor is driven. The direction of operation of our power-transmission system may be reversed by running the constant-speed motor in the opposite direction and reversing the direction of rotation of the field of the induction-motor clutch or in any other suitable way.

In the modified arrangement as shown in Fig. 3, in which the system is operated from a single-phase supply-circuit, the single-phase current from said circuit maintains the synchronous motor in operation when the clutch is not energized and the mechanism to be driven is at rest. This single-phase current will also have an inductive action on the other winding of synchronous motor, so that a two-phase current will be available for the energization of the induction-motor or generator when the connections as shown in the drawings are made. The actions of this induction-motor or generator in this case are the same as those in the case of Figs. 1 and 2 and may be governed in the same way.

The synchronous motor may be started from rest in any suitable manner; but the most convenient way would be to start it by means of the induction-motor D, provided that during this operation the element E is kept from rotating by any suitable means.

Since the power factor of a circuit which supplies a synchronous motor may be governed by varying the excitation of the field of the synchronous motor, a strong field producing a leading current and a weak field producing a lagging current, we are enabled to maintain a high power factor by use of a controller in the field-circuit of a synchronous motor. The excitation of this field may be so regulated that at all times during the operation of the system, whether the mechanism is being started or has been brought up to full speed, a proper power factor may be maintained. The field-circuit may be regulated either by automatic means in connection with the variation of the strength of the current supplying the synchronous motor or by hand. Means for automatically regulating the excitation of the field are shown in Fig. 4. A suction-coil N is interpolated in one of the three-phase supply-circuits of the armature A and acts upon an iron core M, preferably laminated, which is fixed to one end of a pivoted lever-arm L, the other end of which is in movable electrical contact with the inductance I. The inductance, lever-arm, energizing-coils of the field-magnet F through the rectifier H, and the secondary of the transformer T, from which the exciting-current is derived, are in series. Now if the strength of the supply-current to the armature increases, thereby tending to weaken the field and lower the power factor, the increase of current in the coil N draws the core M farther into the coil. By the movement of the lever-arm L the amount of the inductance I in the field-circuit is diminished, the strength of the exciting-current is thereby increased, the field made stronger, and a proper power factor maintained.

The system will be operative in connection with any number of phases. Both the synchronous motor and the induction-motor may be single phase, in which case, however, the torque would be much lower than if both machines were polyphase.

What we claim as new, and desire to secure by Letters Patent, is—

1. The combination with a constant-speed driving-motor and a driven mechanism of an induction-motor intermediate thereto and serving when driven by the constant-speed motor above synchronous speed, as a variable-speed clutch, for transmitting the power of the driving-motor to the driven mechanism, as set forth.

2. The combination with a constant-speed driving-motor and a driven mechanism, of a polyphase induction-motor intermediate thereto and serving, when driven by the constant-speed motor above synchronous speed, as a variable-speed clutch, for transmitting the power of the driving-motor to the driven mechanism, as set forth.

3. The combination with a constant-speed driving-motor and a driven mechanism of a polyphase induction-motor intermediate thereto, and serving as a clutch for transmitting the power of the driving-motor to the driven mechanism, and means for controlling the direction of the rotating field in the said induction-motor, as set forth.

4. The combination with an alternating-current synchronous motor and a mechanism driven thereby, of an alternating-current induction-motor clutch intermediate thereto, and electrical connections between the primary circuits of the two motors whereby the induction-motor will supply energy to the synchronous motor, as set forth.

5. The combination with a constant-speed driving-motor and a mechanism driven thereby, of an alternating-current induction-motor clutch, intermediate thereto, a circuit or circuits and connections between the same and the induction-motor, whereby energy will be delivered to said circuits by the said motor, as set forth.

6. In a propulsion system, the combination with a synchronous motor and mechanism to be driven thereby, of an alternating-current induction-motor, one element of which is driven above synchronism by the synchronous motor, the other element being connected to the mechanism to be driven and free to rotate in either direction.

7. The combination, with an alternating-current synchronous motor, of a clutch for transmitting its power consisting of an induction-motor driven above synchronous speed and connected to the supply-circuit in multiple with the synchronous motor.

8. The combination, with an alternating-current synchronous motor, of a clutch for transmitting its power consisting of a two-phase induction-motor driven above synchronous speed, having one of its phases connected to a single-phase supply-circuit and the other phase connected by a local circuit to one of the phases of the synchronous motor as set forth.

9. The combination, with an alternating-current synchronous motor and mechanism to be driven thereby, of an induction-motor, one element of which is connected to the shaft of the synchronous motor, the other element being connected to the mechanism to be driven thereby, and means for reversing the direction of rotation of the magnetic field of the induction-motor.

10. In a power-transmission system, the combination with a single-phase supply-circuit of a two-phase synchronous motor, having one phase connected to said supply-circuit and its other phase connected by local circuit to a corresponding phase of an induction-generator, whereby the said synchronous motor is driven by two-phase currents.

11. In a power-transmission system, the combination with a supply-circuit of a synchronous motor connected thereto, an induction-motor, one element of which is driven above synchronous speed by the synchronous motor and connections through which said induction-motor feeds back energy into the supply-circuit.

12. The combination with an alternating-current synchronous motor, of a clutch for transmitting its power, consisting of an induction-motor driven above synchronous speed, and connected to the circuit or circuits supplying current to the synchronous motor, and means for varying the electrical constants of the induction-motor circuits, as set forth.

13. In a power-transmission system, the combination with a supply-circuit of a synchronous motor connected thereto, an induction-motor one element of which is driven above synchronous speed by the synchronous motor and connections through which said induction-motor feeds back energy into the supply-circuit, and means for regulating the field excitation of the synchronous motor.

14. The combination with an alternating-current-supply circuit, of a constant-speed driving-motor connected therewith, driven mechanism, and a variable-speed alternating-current motor intermediate thereto and connected with said supply-circuit and serving as a variable-speed clutch for transmitting the power of the driving-motor to the driven mechanism.

VICTOR S. BEAM.
CHARLES L. CLARKE.

Witnesses:
S. S. DURHAM,
THOMAS J. BYRNES.